United States Patent [19]

Touchette et al.

[11] 4,087,305
[45] May 2, 1978

[54] BUILDING ARBOR FOR TIRES AND LIKE ARTICLES HAVING INEXTENSIBLE BEAD RINGS

[75] Inventors: John W. Touchette, Hartville; Paul E. Appleby, Cuyahoga Falls, both of Ohio

[73] Assignee: The Goodyear Tire & Rubber Company, Akron, Ohio

[21] Appl. No.: 691,275

[22] Filed: Jun. 1, 1976

[51] Int. Cl.² ............................................. B29H 17/22
[52] U.S. Cl. ................................... 156/401; 156/132; 156/414
[58] Field of Search ............... 156/132, 394, 400, 401, 156/414, 416, 417, 418, 419, 420

[56] References Cited

U.S. PATENT DOCUMENTS

| | | | |
|---|---|---|---|
| 2,084,009 | 6/1937 | Sohl | 156/400 |
| 2,980,160 | 4/1961 | Deibel | 156/415 |
| 3,027,289 | 3/1962 | Gitzinger | 156/414 |
| 3,053,308 | 9/1962 | Vanzo et al. | 156/132 |
| 3,434,897 | 3/1969 | Caretta et al. | 156/401 |
| 3,489,634 | 1/1970 | Pizzo et al. | 156/415 |
| 3,490,980 | 1/1970 | Mallory et al. | 156/401 |
| 3,853,653 | 12/1974 | Olbert et al. | 156/132 |

*Primary Examiner*—David Klein
*Assistant Examiner*—John E. Kittle
*Attorney, Agent, or Firm*—R. S. Washburn

[57] ABSTRACT

A simple low cost building arbor having a wide range of axial length or bead set length variation. The arbor has no moving parts which are not of rubber or rubber-like material and is operable by air pressure alone. An expandable ring expands, by air pressure, to hold a bead ring in axial position and independently a turn-up bladder is expanded to turn a ply sleeve end about the bead ring. Operating air is conducted, in all axially selected positions in the range, not by tubing but by air transfer chambers connecting the bladder and a sleeve associated with the expandable ring with passage in the center shaft.

1 Claim, 2 Drawing Figures

BUILDING ARBOR FOR TIRES AND LIKE ARTICLES HAVING INEXTENSIBLE BEAD RINGS

The present invention relates to a building arbor for tires and like articles.

The principal object of the invention is the provision of a simple, low cost building arbor actuable solely by fluid pressure to position an inextensible bead ring about a ply in cylindrical form on the arbor and to turn the ply ending about the bead ring. Broadly, the objects of the invention are accomplished in a building arbor comprising a center shaft having passages for conducting fluid, a pair of end rings axially slidable on the center shaft and having axially elongated annular air transfer chambers, the chambers being in air flow communication, respectively, with said passages and with a plurality of inflatable members affixed to each of the end rings, each of the members being expandable by fluid pressure in the respectively associated passage independently of another of said members in any selected axial position of the respectively associated end ring.

Briefly, the objective of the invention is accomplished also by a building arbor having a fixed nonexpandable building surface and a pair of expandable beadseating rings located respectively at the axial ends of the building surface, said beadseating rings being mounted respectively in unitary assemblies each including a primary ring, and means for adjustably fixing the axial distance between the two end rings comprising a pair of semi-cylindrical shells of selected axial length axially abutting each end ring and supported coaxially of the arbor by said end rings.

To acquaint persons skilled in the most closely related arts certain preferred embodiments illustrating the best mode now contemplated of putting the invention in practice are described hereinbelow making reference to the attached drawings forming a part of the description and of this specification.

Figure 1:
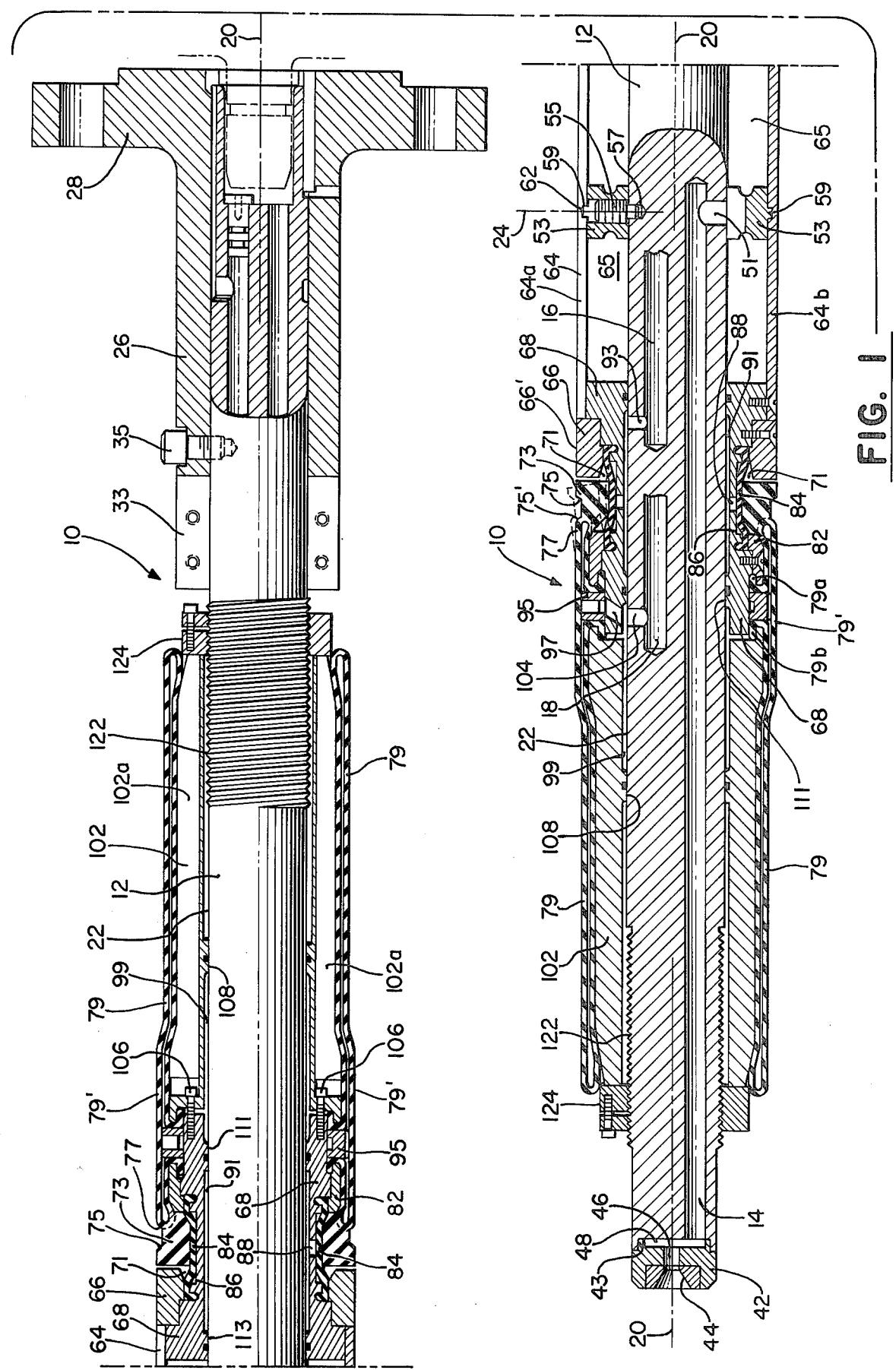
FIG. 1 illustrates an embodiment of a building arbor in accordance with the invention.

A building arbor 10, FIG. 1, in accordance with the invention has a central shaft 12 which is solid except for three passages 14, 16, 18 parallel to the rotation axis 20 of the shaft. The smooth exterior cylindrical surface 22 of the shaft extends axially equidistantly outward of a midplane 24 normal to the axis. At the supported end of the shaft, it is disposed snugly in the axial bore of a collet 26 having a flange 28 adapted for mounting on a building machine spindle (not shown) which is provided with means for delivering two independently controlled supplies of compressed air. The end of the collet is split longitudinally to provide a compression clamp 33 securing the shaft therein and with a plurality of cap screws 35 which fix the shaft axially relative to the flange.

At the free end of the shaft remote from the collet a shaft end piece 42 fitted in a recess 43 concentric in the shaft accommodates a hardened center 44 having a passage 46 axially therethrough which communicates with a space 48 between the end piece and the bottom of the recess connecting the passage 46 in the center 44 with the first 14 of the passages in the shaft 12. The arrangement provides for support by a conventional live center at the free end of the shaft as well as for connecting vacuum or air pressure to the arbor by way of the port 51.

A ring 53 is mounted on the shaft symmetrically with the midplane 24, held by the dog point screws 55 which engage the locating holes 57 in the shaft. A center locating rib 59 extending circumferentially about the ring 53 and radially outward from its circumference registers in a conjugate circumferential groove 62 formed in the radially inner surface of the cylindrical wall member 64 as to locate the member symmetrically with respect to the plane 24.

The cylindrical surface of the wall member 64 has a suitable number of small perforations communicating with the interior space 65. Air can be delivered under pressure to or exhausted by vacuum from the space 65 by way of the port 51 and passage 14, and the pressure difference between the surrounding atmosphere and the space 65 thus be applied to a tire carcass or other flexible sleeve disposed on the arbor.

The member 64 comprises a pair of semi-cylindrical shells 64a, 64b which are selectively interchangeable to provide different working lengths of the arbor as presently will appear. The axial ends of the shells abut respectively a pair of split clamp rings 66 and are supported radially by the respective primary end rings 68 to which the clamp rings are rigidly secured. The cylindrical surfaces of the clamp rings and of the shells are at equal radial heights from the axis and cooperate to provide the cylindrical working surface of the arbor between a spaced apart pair of annular recesses 71.

In each of the annular grooves a gum rubber beadseating ring 73 is disposed coaxially of the shaft. In the radially outer surface of each of the rings 73 is a bead set groove 75 the axially outer wall 75' of which is formed by the axially inner edge portion 77 of a turnup bladder 79. Each of the beadseating rings 73 is joined integrally with the inward edge portion 77 of the respective turnup bladder. The radially outer surface 79' of the turnup bladder for at least a portion of its axial length extends outward from the ring 73 at the same radial level as the surface of the wall 64 and of the clamp rings 66.

The inward edge portion of each bladder is supported by a split clamp ring 82 which is secured rigidly to the respective primary end ring 68.

An expansion sleeve 84 of gum rubber or the like extends axially across each recess 71 as well as circumferentially thereof and supports the seating ring 73 in its contracted condition as illustrated in FIG. 1.

Between the bottom of the recess 71 and the expansion sleeve 84 a chamber 86 is formed which communicates by way of a port 88 in the end ring 68 and the air transfer chamber 91 provided by the annular space between the inner circumference of the end ring 68 and the cylindrical surface 22 of the shaft, and thence by way of the shaft port 93 to the second 16 of the passages in the shaft 12. The arrangement enables the beadseating ring 73 to be expanded by compressed air admitted into the chamber 86 in the end ring beneath the expansion sleeve 84. It is particularly to be noted that this expansion of the ring 73 is not only effected solely by fluid pressure rather than by mechanical linkage but is also controlled completely independently of the actuating compressed air for the turnup bladder 79 itself, about to be more fully described.

Moreover, to effect a rotation of the axial cross-section, that is, a greater expansion of the ring 73 axially inward of an inextensible bead therearound than the expansion axially outward of the bead, a preferred arrangement of the ring 73 and sleeve 84 is employed. The sleeve 84, being fixed at each of its edges in the recess 71, tends to expand to its greatest extent at its own midplane, which is its plane of maximum elongation, circumferentially. The beadseating ring 84 tends to be elongated circumferentially at different rates or by differing amounts between its axial edge close to the ring 66 and its other edge attached to the bladder 79. In order to accomplish such rotation the plane of maximum circumferential elongation of the sleeve 84 is offset axially of the beadseating ring 73 a small but sufficient amount, about 5 millimeters. The degree of such rotation can also readily be varied by minor alteration of the cross-section shape of the ring 73, of the sleeve 84, or of the amount of offset.

The turnup bladders 79 each terminate in a pair of circumferential flanges 79a, 79b and are supported radially by the end ring 68. The flanges are spaced apart by the channel rings 95 in which a radial passage provides for airflow communication between the bladder 79, the air passage 97 in the end ring, the air transfer chamber 99 formed between the bladder support sleeve 102, the end ring 68 and the shaft 12, and by way of the shaft port 104 to the third longitudinal passage 18 in the shaft. As previously indicated, this arrangement permits the actuation of the turnup bladder 79 independently of the actuation of the beadseating ring 73.

The flanges 79a, 79b of each bladder are clamped respectively between the channel ring 95 and the split lock ring 82 and between the ring 95 and the bladder support sleeve 102 which is disposed slidably on the smooth cylindrical surface 22 of the shaft. Each bladder support sleeve is provided with longitudinal grooves 102a giving access to the cap screws 106 which connect the sleeve to the respective primary end ring 68 and effect clamping of the bladder flanges. In the interior of each support sleeve is a circumferential land 108 having a seal, such as an O-ring, which seals the transfer chamber 99 to its axially outer end. The primary end ring 68 is provided with a pair of similar circumferential lands 111, 113 of which the land 111 seals against communication of compressed air along the shaft between the space 65 and the air transfer chamber 91 and the land 113 seals against communication between the two air transfer chambers 91 and 99.

On consideration of FIG. 1, it will be seen that the lengthwise adjustment of the arbor to provide a bead set width in the present embodiment of from 5 to 10 inches, is accomplished simply by selecting the appropriate length of the shells 64a, 64b and sliding the primary end ring and the parts attached thereto to abut the ends of the shells selected. Only the shells need be exchanged; no other assembly or disassembly of parts is required.

To maintain the desired axial length adjustment, in particular the selected bead set width, the shaft 12 has near each end a threaded section 122 and a nut 124 threaded cooperatively thereon. Each nut can be moved along its respective threaded section to secure the associated end ring, and beadseating ring with their associated parts in place axially relative to the rib 59 and midplane 24. It will be readily understood that the diameters of the threaded sections 122 and the respectively associated nuts 124 will differ in a usual manner to facilitate assembly of the arbor.

Figure 2:
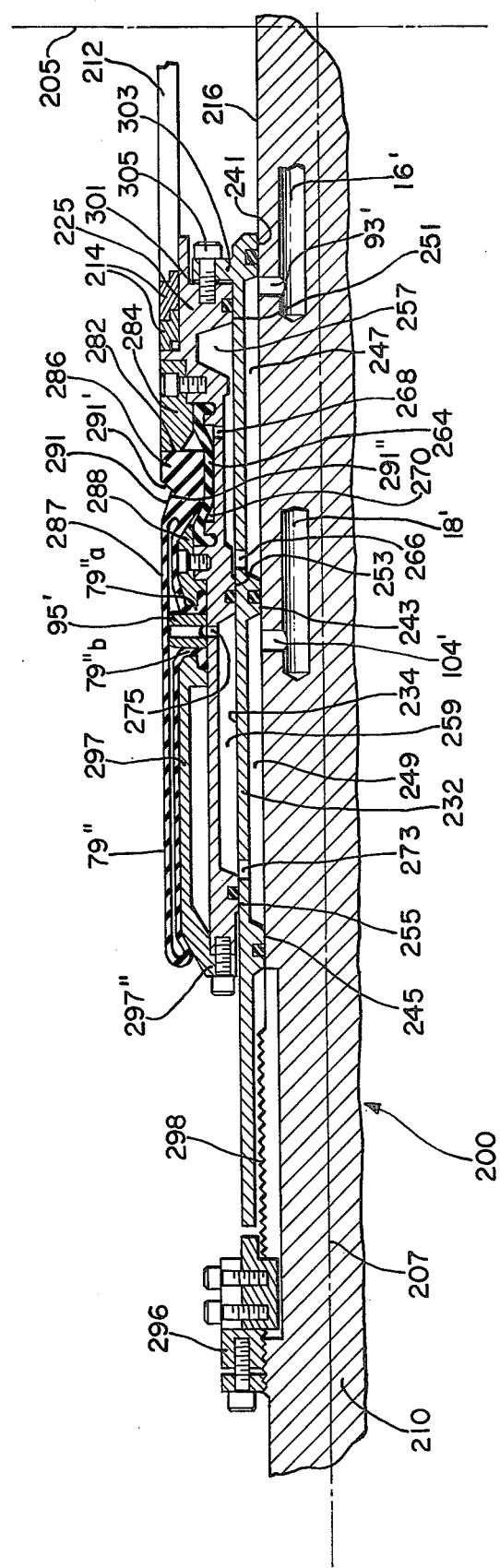
FIG. 2 illustrates a further embodiment of a building arbor in accordance with the invention.

The arbor 200, FIG. 2, in accordance with a further aspect of the invention, has a center shaft 210 the description of which need not be repeated since it is identical in all significant respects to the shaft, FIG. 1. The arrangement of parts on the shaft 210, as in the arbor 10, is symmetrical with respect to a midplane 205 as well as the shaft axis 207. It will, therefore, be understood that FIG. 2 represents, in a manner well understood in the related arts, a complete building arbor the complete showing of which would merely repeat the arrangement of FIG. 2. The arbor also includes a pair of semicylindrical shells 212 similar to the shells 64a, 64b described in connection with FIG. 1. In the present embodiment selected lengths of the shells 212 can be combined with selected spacers 214 more economically to provide a range of selectable bead set lengths.

The present arbor 200 differs from the previously described arbor 10 in that there is disposed between the smooth cylindrical surface 216 of the shaft and the primary end ring 225 a shaft sleeve 232 having an outer smooth cylindrical surface 234 slidably fitted in the primary end ring 225 as well as on the shaft 210. The sleeve 232 has three internal circumferential lands 241, 243, 245 each of which accommodates a sealing O-ring. An air transfer chamber 247 is located axially between the lands 241 and 243. Another airflow chamber 249 is formed between the lands 243 and 245.

Each primary end ring 225 is disposed coaxially of the shaft sleeve 232 and is fitted slidably thereto. Three circumferential lands 251, 253, 255 each accommodates a seal slidably sealing the primary end ring to the shaft sleeve. The two transfer chambers 257, 259 are formed, respectively, between the lands 251, 253 and between the lands 253, 255. Airflow communication is established to actuate the expandable sleeve 264 by way of the passage 16' in the shaft 210 through the port 93' in the shaft, the air transfer chamber 247, the port 266 in the wall of the shaft sleeve, the chamber 257, the port 268 in the primary end ring 225 leading to the chamber 270 within the expandable sleeve.

Airflow communication for actuating the bladder 79" is established by way of passage 18', the shaft port 104', the air transfer chamber 249, the port 273 in the wall of the shaft sleeve, the air transfer chamber 259 and the port 275 into the spacer 95' between the flanges 79"a, 79"b of the turnup bladder 79".

As in the previously described arbor the expandable sleeve 264 is secured across and circumferentially in the annular recess 282 by the split clamp rings 284 rigidly fixed to the primary end ring 225 to function as a part thereof. The gum rubber expandable beadseating ring 286 circumferentially surrounds and is supported by the expandable sleeve 264. The forward edge portion 287 of the bladder is supported by the radially outer surface of the clamp ring 288 so that the radially outer surface of the turnup bladder 79", the beadseating ring 286, the split clamp ring 284, the shells 212 and the spacer segments 214, when used, are all at the uniform radial height with respect to the axis 207.

A particular feature is provided in the shape of the bead accommodating groove 291 extending circumferentially about the beadseating ring 286. This groove 291 is formed with a short side 291' forming approximately 30 degrees with a plane normal to the axis and a longer side 291" disposed at an angle of about 80° to 85° with respect to the same plane.

The beadseating ring 286 is adhered to and made integral with the forward edge 287 of the turnup bladder 79", the flange 79"a of which is secured by the split ring clamp 288. The arrangement provides, as described previously, that the beadseating ring when expanded by the expandable sleeve 264 tends to expand to a greater circumference at its edge axially inward of a bead thereon than it does at its axially outer edge adjoined to the bladder. This difference in the degree of expansion tends to rotate a typical axial cross-section of the ring 286 thus to expand plies adjacent the bead thereon to a diameter at least slightly greater than the inside diameter of the inextensible bead. As in the previously described arbor 10 this expansion of the seating ring 286 is controlled independently of the expansion of the turnup bladder itself.

Axially outwardly of the channel ring 95' the turnup bladder is supported by the cylindrical surface of the support sleeve 297, the flange 297' of which is secured to and made a part of the primary end ring 225. The sleeve 297 serves also to clamp the respective flanges of the bladder to the primary end ring.

In the arbor, FIG. 2, it will be observed upon inspection of the drawing that the axial adjustment capacity is increased considerably by the use of the additional pair of air transfer chambers provided by the shaft sleeve. This adjustment is effected without the need to employ flexible tubing in the drum to connect the expandable sleeve and the turnup bladder with the compressed air supply in the shaft. A part of the bead set length adjustment can be effected by manipulating the nut 296 on the threaded section 298, moving the entire assembly a distance corresponding to the axial length of the air transfer chambers relative to the respective shaft ports without changing the axial relation between the primary end ring and the shaft sleeve. Additional, or independent adjustment of bead set length can be accomplished similarly by moving the primary end ring axially relative to the shaft sleeve by the distance corresponding to the axial length of the air transfer chambers. This is effected by providing an annular spacer 301 of selected axial length between the face of the flange 303 on the shaft sleeve 232 and the opposing face of the primary end ring 225, and of course substituting a cap screw of appropriate length for the cap screw 305 illustrated.

The particular mechanical elements of the arbor 200 not described are identical to or similar in structure and function to those described in connection with the arbor of FIG. 1.

While certain representative embodiments and details have been shown for the purpose of illustrating the invention, it will be apparent to those skilled in the art that various changes and modifications may be made therein without departing from the spirit or scope of the invention.

What is claimed is:

1. A building arbor for use in building a flexible cylindrical article having at least one end portion turned or folded about an inextensible bead ring, which arbor in use is free of relatively moving metal parts, such arbor comprising a shaft, rigid cylindrical building surface having a multiplicity of perforations therethrough, a circumferentially expandable elastomeric ring having an inflatable bladder attached integrally thereto and extending axially away from said surface and disposed close to and at the same radial level as said surface, said expandable ring having a coaxial groove in its radially outward surface, an expandable sleeve secured to said shaft coaxially of each expandable ring, an annular recess defining with said expandable sleeve an inflation chamber, said sleeve having a plane of maximum circumferential elongation midway between its circumferential edges, said plane being axially inward of the associated expandable ring so that on being inflated the sleeve expands the expandable ring and rotates each axial cross-section thereof angularly with respect to the shaft, thereby expanding more at its axially inward side than at its axially outward side relative to an inextensible ring disposed therearound.

* * * * *